(12) United States Patent
Saura et al.

(10) Patent No.: US 11,501,072 B1
(45) Date of Patent: Nov. 15, 2022

(54) SYSTEM, METHOD, AND COMPUTER PROGRAM PRODUCT FOR AUTOMATED FACTUAL CITATION DETECTION

(71) Applicant: Clearbrief, Inc., Seattle, WA (US)

(72) Inventors: Jose Demetrio Saura, Seattle, WA (US); Jacqueline Grace Schafer, Seattle, WA (US); Tovi Jordan Newman, Seattle, WA (US)

(73) Assignee: Clearbrief, Inc., Seattle, WA (US)

( * ) Notice: Subject to any disclaimer, the term of this patent is extended or adjusted under 35 U.S.C. 154(b) by 0 days.

(21) Appl. No.: 17/831,525

(22) Filed: Jun. 3, 2022

Related U.S. Application Data

(60) Provisional application No. 63/314,635, filed on Feb. 28, 2022.

(51) Int. Cl.
| | | |
|---|---|---|
| *G06F 40/284* | (2020.01) | |
| *G06F 40/134* | (2020.01) | |
| *G06F 16/35* | (2019.01) | |
| *G06F 40/166* | (2020.01) | |

(52) U.S. Cl.
CPC ............ *G06F 40/284* (2020.01); *G06F 16/35* (2019.01); *G06F 40/134* (2020.01); *G06F 40/166* (2020.01)

(58) Field of Classification Search
CPC ...... G06F 40/284; G06F 16/35; G06F 40/134; G06F 40/166
USPC .............................................................. 704/9
See application file for complete search history.

(56) References Cited

U.S. PATENT DOCUMENTS

| | | |
|---|---|---|
| 7,529,756 B1 | 5/2009 | Haschart et al. |
| 7,778,954 B2 | 8/2010 | Rhoads et al. |
| 8,019,769 B2 | 9/2011 | Rolle |
| 8,201,085 B2 | 6/2012 | Rollins et al. |
| 9,177,013 B2 | 11/2015 | Rollins et al. |
| 9,760,961 B2 | 9/2017 | Steensgard |
| 10,002,116 B2 | 6/2018 | Pop-Lazarov et al. |
| 11,194,963 B1 | 12/2021 | Schafer et al. |
| 2019/0006027 A1 | 1/2019 | Sacaleanu et al. |
| 2020/0193153 A1 | 6/2020 | Lee et al. |

*Primary Examiner* — Thierry L Pham
(74) *Attorney, Agent, or Firm* — The Webb Law Firm

(57) ABSTRACT

A method, system, and computer program product is provided for tokenizing document citations. The method may include tokenizing each string of a plurality of strings into at least one citation token representing at least one citation parameter, resulting in a plurality of citation tokens, grouping the plurality of citation tokens into a plurality of token groups, each token group of the plurality of token groups including at least one citation token representing a separate citation in the at least one textual document, assigning metadata to each token group of the plurality of token groups, and generating a normalized citation for each token group of the plurality of token groups based on the metadata.

28 Claims, 14 Drawing Sheets

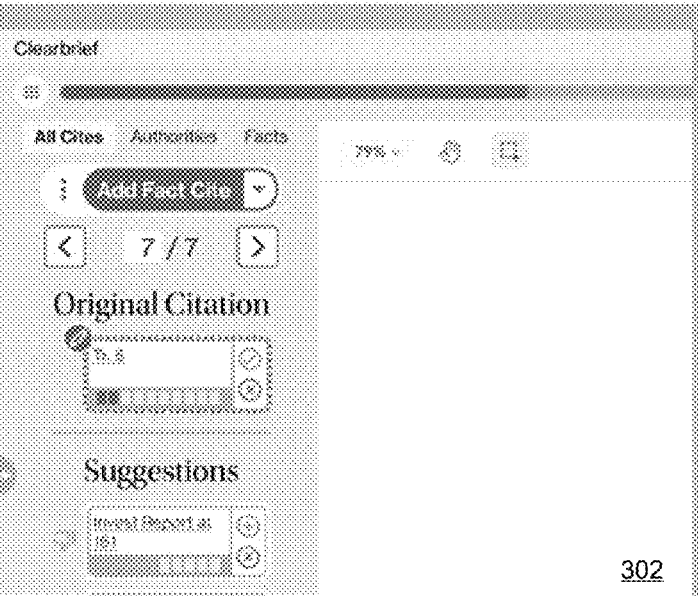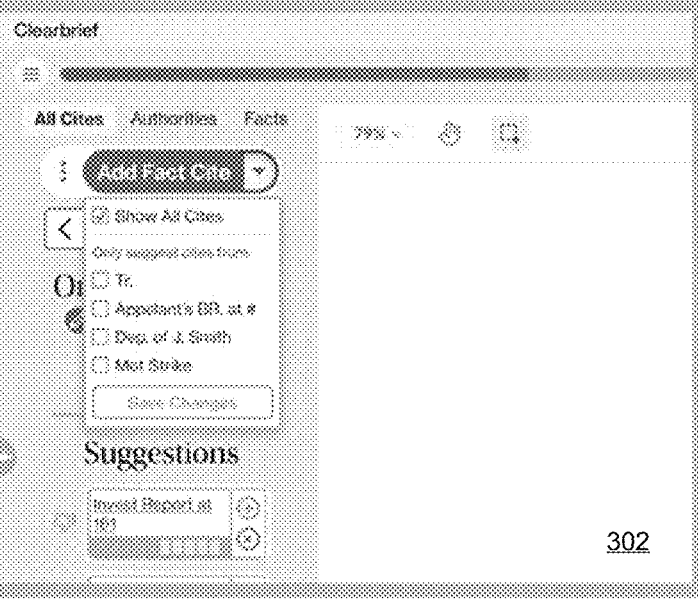
FIG. 3H

```
Federal Rule of Appellate Procedure 26          Federal Rule of Appellate Procedure {?}
SB 707                                          SB {?}
LLC, No. 6:19-                                  LLC, No. {?}
Code Section 626                                Code Section {?}
Stats. 1967                                     Stats. {?}
Tex. Aug. 20, 2020                              LEXIS {?}
LEXIS 15992                                     ER {?}
ER 28,29                                        Code Section {?}
Code Section 26150                              ER {?}
ER 29,                                          ER {?} Compl., ¶ {?}
ER 44, Compl., ¶ 10                             ER {?} Compl., ¶ {?}
ER 44, Compl., ¶ 11                             ER {?} Compl., ¶ {?}
ER 44, Compl., ¶ 12                             ER {?} Compl., ¶ {?}
ER 45, Compl., ¶ 13                             ER {?} Compl., ¶ {?}
ER 45, Compl., ¶ 14                             ER {?} Compl., ¶ {?}
ER 45, Compl., ¶ 15                             ER {?} Compl., ¶ {?}
ER 45, Compl., ¶ 16–17                          ER {?} Compl., ¶ {?}
ER 46–47, Compl., ¶¶ 21–24                      ER {?} Compl., ¶¶ {?}
ER 45, Compl., ¶ 17                             ER {?} Compl., ¶ {?}
ER 45, Compl., ¶ 18                             ER {?} Compl., ¶ {?}
ER 45–46, Compl., ¶ 19                          ER {?} Compl., ¶ {?}
ER 49                                           ER {?}
Weapon Licensing Policy at 2                    Weapon Licensing Policy at {?}
ER 41–52                                        ER {?}
ER 56, Dkt. 14                                  ER {?} Dkt. {?}
ER 5–17                                         ER {?}
ER 1–4                                          ER {?}
F.3d 1089, 1094                                 F.3d {?} {?}
F.3d 841, 844                                   F.3d {?} {?}
F.3d 1053, 1061                                 F.3d {?} {?}
F.3d 1053, 1064                                 F.3d {?} {?}
F.3d 1158, 1167                                 F.3d {?} {?}
ER 10–11                                        ER {?}
F.3d 1420, 1434                                 F.3d {?} {?}
ER 28,                                          ER {?}
F.3d at 1056, 1059                              F.3d at {?} {?}
SB 707.                                         SB {?}
ER 29                                           ER {?}
ER 36,                                          ER {?}
ER 18                                           ER {?}
ER 14–15                                        ER {?}
F.3d at 1090                                    F.3d at {?}
F.3d at 1091                                    F.3d at {?}
ER 14                                           ER {?}
ER 9                                            ER {?}
ER44                                            ER{?}
ER 44                                           ER {?}
ER 16.                                          ER {?}
ER 31                                           ER {?}
See ER 46–47, Compl., ¶¶ 20–23                  See ER {?} Compl., ¶¶ {?}
Gen. Op. No. 09-901, 93                         Gen. Op. No. {?} {?}
ER 30,                              401         ER {?}                              402

FIG. 4A                                         FIG. 4B
```

Federal Rule of Appellate Procedure {page}
ER {page}
ER {page}
ER {page} Compl., ¶ {para}
ER {page} Compl., ¶ {para}
ER {page} Compl., ¶ {para}
ER {page} Compl., ¶ {para}
ER {page} Compl., ¶ {para}
ER {page} Compl., ¶ {para}
ER {page} Compl., ¶ {para}
ER {page} Compl., ¶ {para}
ER {page} Compl., ¶ {para}
ER {page} Compl., ¶ {para}
ER {page} Compl., ¶ {para}
ER {page}
Weapon Licensing Policy at {page}
ER {page}
ER {page} Dkt. {para}
ER {page}
ER {page}
F.3d {page} {para}
F.3d {page} {para}
F.3d {page} {para}
F.3d {page} {para}
F.3d {page} {para}
ER {page}
F.3d {page} {para}
ER {page}
F.3d at {page} {para}
ER {page}
ER {page}
ER {page}
ER {page}
F.3d at {page}
F.3d at {page}
ER {page}
ER {page}
ER{page}
ER {page}
ER {page}
ER {page}
ER {page} Compl., ¶ {para}
ER {page}

Weapon Licensing Policy at {page}
LEXIS {page}
Stats. {page}
Gen. Op. No. {page} {para}
LLC, No. {page}
F.3d at {page}
ER{page}
F.3d at {page} {para}
ER {page} Compl., ¶ {para}
F.3d {page} {para}
ER {page}
Code Section {page}
Federal Rule of Appellate Procedure {page}
ER {page} Dkt. {para}

404

FIG. 4D

SYSTEM, METHOD, AND COMPUTER PROGRAM PRODUCT FOR AUTOMATED FACTUAL CITATION DETECTION

CROSS REFERENCE TO RELATED APPLICATION

This application claims priority to U.S. Provisional Patent Application No. 63/314,635, filed Feb. 28, 2022, the entirety of which is hereby incorporated by reference.

BACKGROUND

1. Field

This disclosure relates generally to document processing and, in non-limiting embodiments or aspects, systems, methods, and computer program products for automated factual citation detection.

2. Technical Considerations

When users seek to create hyperlinks or otherwise display a factual source document referenced in a word processing document, they have to manually identify to the word processing application which fragments of text in the document are the references they want to create the links for. Existing methods for identifying citations rely on an assumption that the citations will follow predefined and/or universal rules (such as the Bluebook® rules for legal documents) for citing to different types of source documents (such as case law, regulations, and statutes). However, for factual source documents (such as the case record, deposition transcripts, court transcripts, publications, and/or the like), different rules and formats are used among authors, entities (e.g., such as an institution associated with an author), and/or jurisdictions. As an example, the following represents variations of how different authors may cite to the same document:

Variation 1: Dep. of J. Smith, 42 para. 6.
Variation 2: Deposition of Smith at 42.
Variation 3. Dep. Tr. Smith, 4/13/21, 42:25, 43:12.
Variation 4: 4/13/21 Deposition Transcript of John Smith (hereinafter referred to as "Dep. JS").

Existing methods for identifying citations that rely on predefined and/or universal rules are unable to handle variations in factual citations among different authors of different textual documents or even among the same author of a textual document.

SUMMARY

According to non-limiting embodiments or aspects, provided is a computer-implemented method comprising: processing a textual document to identify a plurality of identified factual citations based on a machine-learning model; normalizing each identified factual citation of the plurality of identified factual citations, resulting in a plurality of normalized identified factual citations; detecting at least one citation pattern in the plurality of normalized identified factual citation; generating at least one citation format rule based on the at least one citation pattern; and determining a plurality of factual citations from the textual document based on the at least one citation format rule.

In non-limiting embodiments or aspects, the method further comprises: tokenizing the textual document into a plurality of tokens corresponding to strings in the textual document before processing the textual document with the machine-learning model. In non-limiting embodiments or aspects, the method further comprises: preserving citation signals while tokenizing the textual document; and removing the citation signals after processing the textual document. In non-limiting embodiments or aspects, the method further comprises: ignoring or removing legal citation components while tokenizing the textual document. In non-limiting embodiments or aspects, the machine-learning model is configured to receive, as input, a group of tokens of the plurality of tokens and output a prediction, the group of tokens comprising a target token, between 1 and 20 adjacent tokens preceding the target token, and between 1 and 20 adjacent tokens succeeding the target token, and the plurality of identified factual citations is based on predictions for each token of the plurality of tokens.

In non-limiting embodiments or aspects, the prediction comprises at least one of a binary classification and a confidence score. In non-limiting embodiments or aspects, the method further comprises: training the machine-learning model based on at least one of the following: a global corpus of textual documents including factual citations, a firm-specific corpus of textual documents including factual citations, a jurisdiction-specific corpus of textual documents including factual citations, or any combination thereof. In non-limiting embodiments or aspects, the machine-learning model comprises a classification model configured to receive a text fragment as input and output a classification. In non-limiting embodiments or aspects, the machine-learning model comprises a classification model configured to receive a text fragment as input and output at least one of a binary classification and a confidence score of a classification. In non-limiting embodiments or aspects, the classification model is configured to process a sliding window of strings comprising a plurality of words preceding a target string and a plurality of words succeeding a target string.

In non-limiting embodiments or aspects, the method further comprises: processing the plurality of normalized identified factual citations based on at least one rule-based algorithm to eliminate at least one normalized identified factual citation of the plurality of normalized identified factual citations before generating the at least one citation format rule. In non-limiting embodiments or aspects, the method further comprises: linking at least one source document from a plurality of source documents to each factual citation of the plurality of factual citations. In non-limiting embodiments or aspects, wherein linking the at least one source document to each factual citation of the plurality of factual citations comprises: inserting a hyperlinked citation into each factual citation which, when selected by a user, displays at least one corresponding source document. In non-limiting embodiments or aspects, the method further comprises: linking at least one source document from a plurality of source documents to at least one of the following: the at least one citation pattern, the at least one citation format rule, or any combination thereof.

In non-limiting embodiments or aspects, the method further comprises: prompting the user for input prior to linking the at least one source document. In non-limiting embodiments or aspects, the input comprises a confirmation that at least one factual citation is correct. In non-limiting embodiments or aspects, the input comprises a modification of at least one factual citation. In non-limiting embodiments or aspects, the method further comprises: displaying the at least one source document; and receiving a selection from the user of a page from the at least one source document, wherein linking the at least one source document to each factual citation of the plurality of factual citations is based on the page selected. In non-limiting embodiments or aspects, the method further comprises updating the machine-learning model based on the input. In non-limiting embodiments or aspects, the input comprises a confirmation of at least one of the at least one citation pattern and the at least one citation format rule. In non-limiting embodiments or aspects, the input comprises uploading or identifying a location of a source document for at least one factual citation, the method further comprises: determining a page corresponding to the at least one factual citation based on comparing text to pages in the source document. In some non-limiting embodiments, the text used for comparison are assertions. In non-limiting embodiments or aspects, the input comprises uploading or identifying a location of a source document for at least one factual citation, the method further comprises: determining a page corresponding to the at least one factual citation based on document stamps. In non-limiting embodiments or aspects, the method further comprises: determining a page corresponding to the at least one factual citation based on a user selection. In non-limiting embodiments or aspects, the method further includes receiving the plurality of source documents from the user, wherein linking the at least one source document from the plurality of source documents is performed automatically without user intervention. In non-limiting embodiments or aspects, the method further includes automatically determining at least one page of the at least one source document for linking to each factual citation of the plurality of factual citations by comparing each factual citation of the plurality of factual citations to each page of each document.

In non-limiting embodiments or aspects, the method further comprises: determining a page offset value based on the page corresponding to the at least one factual citation and a structure of the source document; and modifying the at least one factual citation based on the page offset value. In non-limiting embodiments or aspects, the at least one citation format rule comprises a regular expression. In non-limiting embodiments or aspects, the method further comprises: storing the at least one citation rule in association with at least one of the following: the user, an entity, a source document, or any combination thereof; and processing a subsequent textual document based on the at least one citation rule. In non-limiting embodiments or aspects, wherein tokenizing the textual document into the plurality of tokens comprises at least one of the following: replacing lower case words in the textual document with a token comprising a lowercase indicator; replacing upper case words in the textual document with a token comprising an uppercase indicator; and replacing title case words in the textual document with a token comprising a titlecase indicator. In non-limiting embodiments or aspects, tokenizing the textual document into the plurality of tokens comprises: replacing each word of a plurality of words with a token comprising an indicator.

According to non-limiting embodiments or aspects, provided is a system comprising at least one processor programmed or configured to: process a textual document to identify a plurality of identified factual citations based on a machine-learning model; normalize each identified factual citation of the plurality of identified factual citations, resulting in a plurality of normalized identified factual citations; detect at least one citation pattern in the plurality of normalized identified factual citation; generate at least one citation format rule based on the at least one citation pattern; and determine a plurality of factual citations from the textual document based on the at least one citation format rule.

In non-limiting embodiments or aspects, the at least one processor further configured to: tokenize the textual document into a plurality of tokens corresponding to strings in the textual document before processing the textual document with the machine-learning model. In non-limiting embodiments or aspects, the at least one processor further configured to: preserve citation signals while tokenizing the textual document; and remove the citation signals after processing the textual document. In non-limiting embodiments or aspects, the at least one processor further configured to: ignore or remove legal citation components while tokenizing the textual document. In non-limiting embodiments or aspects, the machine-learning model is configured to receive, as input, a group of tokens of the plurality of tokens and output a prediction, the group of tokens comprising a target token, between 1 and 20 adjacent tokens preceding the target token, and between 1 and 20 adjacent tokens succeeding the target token, and the plurality of identified factual citations is based on predictions for each token of the plurality of tokens.

In non-limiting embodiments or aspects, the prediction comprises at least one of a binary classification and a confidence score. In non-limiting embodiments or aspects, the at least one processor further configured to: train the machine-learning model based on at least one of the following: a global corpus of textual documents including factual citations, a firm-specific corpus of textual documents including factual citations, a jurisdiction-specific corpus of textual documents including factual citations, or any combination thereof. In non-limiting embodiments or aspects, the machine-learning model comprises a classification model configured to receive a text fragment as input and output a classification. In non-limiting embodiments or aspects, the machine-learning model comprises a classification model configured to receive a text fragment as input and output at least one of a binary classification and a confidence score of a classification. In non-limiting embodiments or aspects, the classification model is configured to process a sliding window of strings comprising a plurality of words preceding a target string and a plurality of words succeeding a target string. In non-limiting embodiments or aspects, the at least one processor further configured to: process the plurality of normalized identified factual citations based on at least one rule-based algorithm to eliminate at least one normalized identified factual citation of the plurality of normalized identified factual citations before generating the at least one citation format rule.

In non-limiting embodiments or aspects, the at least one processor further configured to: link at least one source document from a plurality of source documents to each factual citation of the plurality of factual citations. In non-limiting embodiments or aspects, wherein linking the at least one source document to each factual citation of the plurality of factual citations comprises: inserting a hyperlinked citation into each factual citation which, when selected by a user, displays at least one corresponding source document. In non-limiting embodiments or aspects, the at least one processor further configured to: link at least one source document from a plurality of source documents to at least one of the following: the at least one citation pattern, the at least one citation format rule, or any combination thereof.

In non-limiting embodiments or aspects, the at least one processor further configured to: prompt the user for input prior to linking the at least one source document. In non-limiting embodiments or aspects, the input comprises a confirmation that at least one factual citation is correct. In non-limiting embodiments or aspects, the input comprises a modification of at least one factual citation. In non-limiting embodiments or aspects, the at least one processor further configured to: display the at least one source document; and receive a selection from the user of a page from the at least one source document, wherein linking the at least one source document to each factual citation of the plurality of factual citations is based on the page selected. In non-limiting embodiments or aspects, the at least one processor further configured to update the machine-learning model based on the input. In non-limiting embodiments or aspects, the input comprises a confirmation of at least one of the at least one citation pattern and the at least one citation format rule. In non-limiting embodiments or aspects, the input comprises uploading or identifying a location of a source document for at least one factual citation, the at least one processor further configured to: determine a page corresponding to the at least one factual citation based on comparing text to pages in the source document. In non-limiting embodiments or aspects, the input comprises uploading or identifying a location of a source document for at least one factual citation, the at least one processor further configured to: determine a page corresponding to the at least one factual citation based on document stamps. In non-limiting embodiments or aspects, the at least one processor further configured to: determine a page corresponding to the at least one factual citation based on a user selection.

In non-limiting embodiments or aspects, the at least one processor further configured to: determine a page offset value based on the page corresponding to the at least one factual citation and a structure of the source document; and modify the at least one factual citation based on the page offset value. In non-limiting embodiments or aspects, the at least one citation format rule comprises a regular expression. In non-limiting embodiments or aspects, the at least one processor further configured to: store the at least one citation rule in association with at least one of the following: the user, an entity, a source document, or any combination thereof; and process a subsequent textual document based on the at least one citation rule. In non-limiting embodiments or aspects, wherein tokenizing the textual document into the plurality of tokens comprises at least one of the following: replacing lower case words in the textual document with a token comprising a lowercase indicator; replacing upper case words in the textual document with a token comprising an uppercase indicator; and replacing title case words in the textual document with a token comprising a titlecase indicator. In non-limiting embodiments or aspects, wherein tokenizing the textual document into the plurality of tokens comprises: replacing each word of a plurality of words with a token comprising an indicator.

In non-limiting embodiments or aspects, the at least one processor is further programmed or configured to receive the plurality of source documents from the user, wherein linking the at least one source document from the plurality of source documents is performed automatically without user intervention. In non-limiting embodiments or aspects, the at least one processor is further programmed or configured to automatically determine at least one page of the at least one source document for linking to each factual citation of the plurality of factual citations by comparing each factual citation of the plurality of factual citations to each page of each document.

According to non-limiting embodiments or aspects, provided is a computer program product comprising at least one non-transitory computer-readable medium including program instructions that, when executed by at least one processor, cause the at least one processor to process a textual document to identify a plurality of identified factual citations based on a machine-learning model; normalize each identified factual citation of the plurality of identified factual citations, resulting in a plurality of normalized identified factual citations; detect at least one citation pattern in the plurality of normalized identified factual citation; generate at least one citation format rule based on the at least one citation pattern; and determine a plurality of factual citations from the textual document based on the at least one citation format rule.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying schematic figures, in which:

FIGS. 3A-3J illustrate example graphical user interfaces (GUIs) according to non-limiting embodiments;

FIGS. 4A-4D illustrate example data outputs for a system and method for automated factual citation detection according to non-limiting embodiments.

DESCRIPTION

Figure 1:
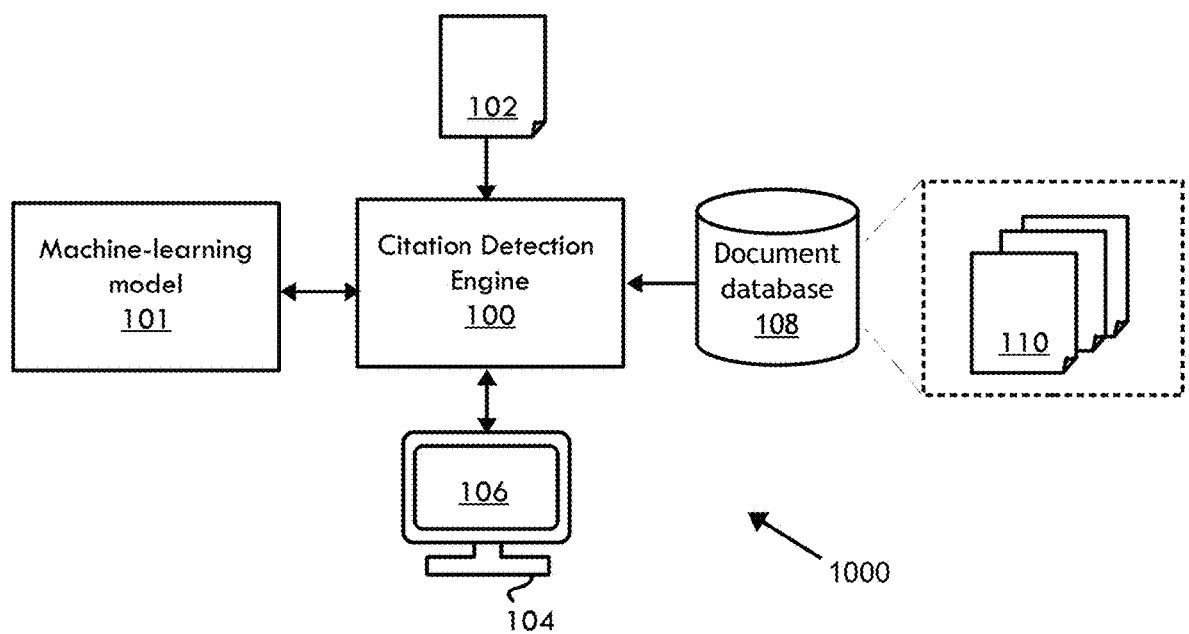
FIG. 1 illustrates a schematic diagram for a system for automated factual citation detection according to non-limiting embodiments.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one."

Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer, server, or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments provide for a system, method, and computer program product for automated factual citation detection that improves upon existing systems for detecting citations. For example, through the use of a first analysis based on a machine-learning algorithm, citation format rules may be dynamically generated for a particular textual document being processed. The generated citation format rules may then be used for a second analysis of the textual document, allowing for the efficient identification and extraction of factual citations from the document. Once identified and extracted, the factual citations may be linked to source documents to create a rich textual document in which source documents are displayed when a corresponding citation is selected. Moreover, through the use of dynamically generated citation format rules and user feedback, the machine-learning model may be trained to improve future performances of the system.

Referring now to FIG. 1, a system 1000 for automatically detecting factual citations is shown according to non-limiting embodiments. As used herein, the term "factual citation" may refer to a reference in a textual document to a source document that corresponds to a quote, assertion, or statement in the textual document. As an example, a legal brief may include factual citations to transcripts (e.g., of testimony, hearings, or the like), pleadings, declarations, and/or the like. A citation detection engine 100 may include one or more computing devices and/or software applications executed by one or more computing devices. A user may access the system 1000 through a client computing device 104 that displays one or more graphical user interfaces (GUIs) 106. The citation detection engine 100 may be local or remote to the computing device 104.

In non-limiting embodiments, the GUI 106 is generated in a frame of a word processing application. The word processing application may be used by a user to edit a textual document 102 and may parse and process the textual document while the user is editing and/or viewing the textual document 102 through the application. In some examples, the word processing application may include a plug-in extension (e.g., an add-in program, script, and/or tool, such as an application toolbar, web browser extension, or the like) that is configured to parse and process the textual document while the user is editing and/or viewing the textual document 102 through the application. Such a plug-in extension may utilize, for example, one or more APIs of the word processing application to integrate with the same.

With continued reference to FIG. 1, the citation detection engine 100 includes and/or executes a machine-learning model 101 to process the textual document 102 to identify a plurality of factual citations. The machine-learning model 101 may be local to the citation detection engine 100 or may be implemented as a remote service accessible through a network connection. In some examples, the citation detection engine 100 and/or another system or device may tokenize the text of the textual document 102 by grouping characters into tokens that can then be processed by the machine-learning model. The machine-learning model may, as an example, process tokens to classify the tokens or groups of tokens as being citations or not citations. The citation detection engine 100 and/or another system or device may then analyze the detected citations to determine one or more citation format rules. As an example, a format rule may specify a pattern of citation elements, such as source, source abbreviation, page number, paragraph number, line number, and/or the like.

In non-limiting embodiments, the machine-learning model may be configured to receive, as input, a group of tokens of the plurality of tokens and output a prediction (e.g., whether the group of tokens represent a factual citation). The group of tokens may include a target token (e.g., a central token) and adjacent tokens (e.g., such as a predefined number of tokens) preceding the target token and adjacent tokens (e.g., such as a predefined number of tokens) succeeding the target token. In non-limiting embodiments, the machine-learning model processes a sliding window of strings that include a plurality of words preceding a target string and a plurality of words succeeding a target string. In non-limiting embodiments, the machine-learning model is a classification model configured to classify a text fragment and/or a group of tokens and output a classification (e.g., a factual citation or not a factual citation) and/or a confidence score associated with a classification.

Still referring to FIG. 1, the citation detection engine 100 and/or another system or device may use the citation format rules to process the original textual document 102 to identify predicted factual citations in the textual document 102. Thus, the textual document 102 may be processed twice, the first pass resulting in citation format rules and the second pass resulting in predicted citations. The predicted citations may be displayed on the GUI 106. In some examples, the predicted citations may be displayed in sequence and the user may be asked to identify a source document 110 from a document database 108 to be associated (e.g. linked) with the citation. For example, a user may select a source document or may upload a source document.

In non-limiting embodiments, a user may upload a plurality of source documents to the document database 108 before, during, or after the automatic citation detection process. The citation detection engine 101 or a different computing device and/or software application may analyze the plurality of source documents uploaded by the user to determine similarities between portions of the textual document (e.g., quotes, assertions, and/or statements preceding or otherwise corresponding to factual citations) and the content of each document. In non-limiting embodiments, a score may be generated for each citation for each source document page based on the relevancy of the page. In some examples, scores may be generated for a subset of source documents selected by the user. One or more algorithms may be used to compare the textual document portions to each page and to score the relevancy of each page. The scoring may be performed on a page-by-page basis such that each citation is associated with a number of scores equaling the number of document pages of all analyzed source documents. For example, if there are 10 citations, 10 documents, and 10 pages per document, each citation would be associated with 100 different scores (one for each page of each document) and there would be a total of 1,000 scores for all of the citations in the textual document. The highest scoring page for each citation may then be automatically linked to the citation. Such a link may include, for example, a hyperlink that navigates the user to the page.

In non-limiting embodiments, the source documents uploaded by a user may be analyzed to determine an offset value for each source document. The offset value represents the number of pages preceding the content of the document (e.g., where the page numbers, such as document page numbers and/or Bates numbers, begin in the document) so that those pages can be skipped for determining citation page numbers. The offset value is determined by comparing the cited page for a citation to the automatically detected page (e.g., the page having the highest relevancy score for linking to the citation). As an example, if a citation cites to the second page of a source document and the matching page is determined to be the tenth page of the source document (e.g., the tenth page of a PDF file or the like), the offset value is determined to be the difference between these values (e.g., 10−2=8).

Figure 2:
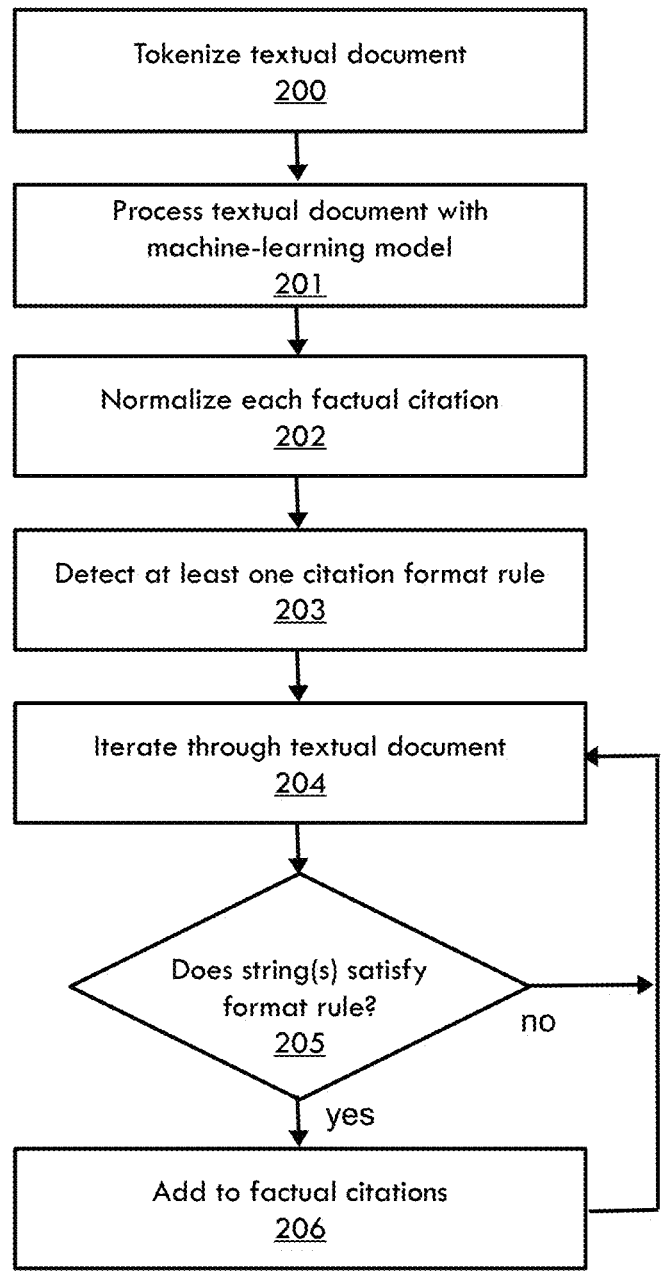
FIG. 2 illustrates a flow diagram for a method for automated factual citation detection according to non-limiting embodiments.

Referring now to FIG. 2, shown is a flow diagram for automatically detecting citations according to non-limiting embodiments. The steps shown in FIG. 2 are for example purposes only, and it will be appreciated that additional, fewer, different, and/or a different order of steps may be used. At a first step 200, a textual document may be tokenized. During tokenization, each string (e.g., each word or other textual element) may be replaced with a generic token. For example, a token "lowercase" or another string may replace any lower case words, a token "uppercase" or another string may replace any upper case words, a token "titlecase" or another string may replace any title case words. As an example, the word "California" would be replaced with "titlecase" and the word "line" would be replaced with "lowercase."

In some non-limiting embodiments, citation signals ("See", "Cf.", "Accord", and/or the like) may be preserved while tokenizing the textual document such that the citation signals are not tokenized or included in any tokens. In some non-limiting embodiments, punctuation may be preserved while tokenizing the textual document such that punctuation is not tokenized or included in any tokens. In some non-limiting embodiments, legal citation components (e.g., a reporter, volume, court abbreviation, and/or the like) may be preserved or removed from the textual document. In some non-limiting embodiments, legal citation components may be treated as regular words in the tokenization process.

In some non-limiting embodiments, the tokenized textual document may be pre-processed with one or more rules to reduce or eliminate false positive detections of factual citations. For example, a date in the legal brief (e.g., "Aug. 15, 2022") may appear similar to a factual citation after tokenization (e.g., would be tokenized as "titlecase 15, 2022"). In this example, the first two tokens ("titlecase" and "15") and comma separator may be confused with a citation to a fact. This can be avoided with a date recognition rule, such as an application of regular expressions. In non-limiting embodiments, various pre-processing rules may be provided to address other issues.

At step 201, the tokenized textual document may be processed by a machine-learning model to identify a first plurality of predicted factual citations. In non-limiting embodiments, the machine-learning model may be a classification model configured to receive one or more tokens and to classify the token(s) as a factual citation and/or component of a factual citation (e.g., a string that is part of a factual citation). For example, in non-limiting embodiments, the machine-learning model may be configured to process, as an input, a plurality of tokens surrounding a particular token of interest (e.g., target token). This may include, as an example, seven (7) tokens preceding the token of interest, the token of interest, and seven (7) tokens succeeding the token of interest. It will be appreciated that other numbers of tokens may be input into the model.

In non-limiting embodiments, the machine-learning model may classify the target token with a binary classification (e.g., TRUE/FALSE). In some examples, the machine-learning model may output a confidence score associated with a classification (e.g., a likelihood that a string corresponding to the target token is part of a factual citation). Once the machine-learning model has processed the tokenized input, the corresponding text of each sequence of tokens (e.g., continuous predictions) may be aggregated. For example, the original text "ER page 100" would be tokenized as "uppercase lowercase 100" at step 200 and the machine-learning model would output: TRUE TRUE TRUE at step 201. Therefore the corresponding text "ER", "page", and "100" (corresponding respectively to the tokens "uppercase", "lowercase" and "100") would be aggregated as a detected factual citation: "ER page 100".

In non-limiting embodiments, the machine-learning model may be trained with documents including classified (e.g., labeled) factual citations. In some examples, the model may be trained on different styles (e.g., different authors), different jurisdiction (e.g., state courts, federal courts, specific state or county courts, and/or the like), and/or different institutions (e.g., a large law firm that has a large enough corpus of documents to use as training data). The use of a machine-learning model allows for enhanced sensitivity and for the ability to detect different factual citation styles which may differ among authors and types of documents.

FIG. 4A illustrates example output data 401 of step 201 of FIG. 2, including raw strings that are output by the machine-learning model. The output data 401 shown has also had strings matching known false positives removed (e.g., dates such as "Apr. 1, 2020").

At step 202 of FIG. 2, the first plurality of factual citations may be normalized. At this stage, a list of predicted factual citations may be stored in memory as a result of step 201 and aggregating the strings. Each predicted factual citation may be normalized by applying one or more rules to help clarify the predicted factual citation for inferring patterns used to determine citation format rules. For example, sequences of numbers may be replaced with "{0}", "(?)", or some other indicator that represents numbers. Further, in some non-limiting embodiments, citation signals and/or punctuation may be removed if not previously removed.

FIG. 4B illustrates example output data 402 of step 202 of FIG. 2 resulting from normalizing the raw strings shown in the example output data 401 shown in FIG. 4A. At step 203, at least one citation format rule may be detected from the normalized factual citations. In non-limiting embodiments, before determining the at least one citation format rule, the list of predicted factual citations may be reduced further by removing any citations that have been previously identified as not being a citation (e.g., such as by a user during a previous session). In some non-limiting embodiments, a user may be prompted through a GUI to manually confirm or reject one or more of the predicted factual citations. The user's response may be stored for use in future iterations. Further, in some non-limiting embodiments, in preparation for determining one or more citation format rules, the list of predicted factual citations may be reduced by removing any duplicate citations. In some non-limiting embodiments in which duplicate citations are removed, the number of duplicates may be counted. In this manner, the number of instances of an identical citation may be considered when determining the confidence of the detected citation format rule.

The one or more citation format rules may be determined by extracting one or more patterns from the list of predicted factual citations. To do so, the plurality of factual citations may be aggregated based on similarity so that the number of citations that follow a particular pattern may be counted. By counting the number of citations having a matching pattern, a confidence (e.g., such as a confidence score) can be determined for that pattern. The pattern having the highest confidence score (e.g., the highest count) may be determined to be a citation format rule. For example, the list may include "ER {page}" and "ER {page} Dkt. {entry}" as separate entries that are formed into separate rules for referring to the record (e.g., Excepts of Record ("ER")). Another example is "ER {page}:{line}", where "line" refers to a line number of a page. At least one pattern extracted from this example is that citations to the record may begin with "ER" followed by a number (a page number) and/or two numbers separated by a colon (a page number and line number). A second pattern extracted from this example is that citations to the record may begin with "ER" followed by a number (a page number), the letters "Dkt." (e.g., docket), and another number (a paragraph number). In an example in which there are multiple instances of "ER {page}", but one instance of "ER:{page}" (with a colon), it can be determined that "ER {page}" is the correct pattern because there are multiple instances of it.

In non-limiting embodiments, detecting the citation format rules may involve disambiguating citation format rules to automatically choose a citation format rule without prompting the user. For example, there may be normalized factual citations that could result in two or more different citation format rules and the correct citation format rule may be determined from these two or more different rules. Such a situation may arise through the use of a colon ":" separating numbers, as an example. In non-limiting embodiments, detecting a colon or two separate numbers in a citation may cause one or more disambiguation rules to be generated and/or applied. In some non-limiting embodiments, citation format rules may be disambiguated based on potential line numbers in a source document. For example, a disambiguation rule may be applied to determine if the numerals in the citation format rule is a page number, a line number, or both a page number and line number. In such an example, the disambiguation rule may specify that a document has a maximum number of lines (e.g., 25 lines per page in a transcript) such that numbers lower than 25 are potentially line numbers or page numbers, but that numbers over 25 are only page numbers. This rule may be predefined or dynamically generated by analyzing the source documents for the maximum number of lines. As an example, for the citation "ER10:8", there may be two possible rules: (1) "ER" is the name of the source document, "10" is the page number, and "8" is the line number, or (2) "ER10" is the name of the source document (e.g., a tenth source document) and "8" is a page number. Applying one or more disambiguation rules, it may be determined that "10" and "8" are both lower than 25 and could therefore be line numbers (in addition to page numbers). Since line numbers follow page numbers and "8" can be a line number (e.g., it does not exceed 25), it can therefore be determined that the second number is a line number and the first number is a page number. Thus, the citation format rule is determined to be "ER{page}:{line}". However, if one of the potential line numbers is greater than 25 (or the value specified by the disambiguation rule), it is determined that it is a page number and not a line number. In the example of "ER10:30", it may be determined that 30 is greater than 25 and therefore must be a page number, which means the preceding number "10" is part of the source document name. As a result, the citation format rule may be determined to be "ER10:{page}". It will be appreciated that other disambiguation rules may be applied where two or more citation format rules are detected for a citation.

FIG. 4C illustrates example data 403 associated with step 203 of FIG. 2 resulting from removing strings that were previously identified as not being a citation from the example data output 402 shown in FIG. 4B. FIG. 4D illustrates example data 404 associated with step 203 of FIG. 2 resulting from removing duplicate strings from the example data output 403 shown in FIG. 4C. It will be appreciated that the example data shown in FIGS. 4A-4C is for illustration purposes only and that other transformations of the text fragments may be performed in accordance with non-limiting embodiments.

At steps 204-206, the citation format rule(s) may be used to extract a second plurality of predicted factual citations. In non-limiting embodiments, this may be performed through the use of regular expression functions, although other approaches may be used. Such functions may extract all text strings from the textual document 102 that match each of the citation format rules. In the example shown in FIG. 2, each string and/or sequence of strings (e.g., strings between delimiters such as periods, line breaks, and/or the like) are iterated through at step 204 and, at step 205, compared to the citation format rule(s). When a matching citation is found, it is added to a list of factual citations at step 206. The factual citations aggregated at step 206 may be stored in any number of data structures and may represent a second plurality of predicted factual citations that is more refined than the first list of predicted factual citations determined at step 201.

In non-limiting embodiments, the factual citations determined at step 206 may be presented to the user on one or more GUIs to be confirmed or rejected. The factual citations may be presented as they are identified and/or as a group after the whole document has been parsed and all of the factual citations identified. In such examples, once a user confirms a factual citation, it may be stored in a separate data structure (e.g., a separate database or list) for confirmed factual citations. In non-limiting embodiments, the one or more citation format rules (e.g., patterns) may be presented to the user on one or more GUIs to be confirmed or rejected. In such examples, once a user confirms a citation format rule or pattern, such a rule may be stored (e.g., such as in a rules database or the like) to be applied in subsequent processes. For example, such saved rules may be used in a subsequent document processing task during step 203 to automatically reject one or more predicted factual citations. Additionally or alternatively, such saved rules may be used to train the machine-learning model executed at step 201. In some non-limiting embodiments, one or more citation format rules may be stored in and associated with a user, a case, a set of documents, an entity (e.g., an organization associated with the user, such as a firm or client), a jurisdiction, and/or the like. Such associations may be, as an example, metadata associated with the stored citation format rule. In some non-limiting embodiments, the user may modify the factual citation.

In non-limiting embodiments, the factual citation may be automatically modified based on the source document. For example, a page offset value may be determined based on the page corresponding to the factual citation and a structure of the source document (e.g., the number of pages preceding a page where numbering begins).

After a user confirms a factual citation, the citation may be linked from the textual document to at least one source document or specific page(s) of a source document. For example, a hyperlink may be inserted into the textual document for the factual citation that causes the source document and/or page(s) of the source document to be displayed (e.g., in a new frame, tab, browser window, and/or the like). As described herein, in non-limiting embodiments one or more pages may be automatically determined based on a relevancy score for a corresponding portion of the textual document (e.g., such as a string preceding the citation) and automatically linked to the citation without requiring user action or prompts.

Referring now to FIGS. 3A-3E, shown are GUIs 300 according to non-limiting embodiments for use in connection with systems and methods for automatically detecting citations. In some examples, the GUI 300 may be displayed as part of a window in a word processing system as an add-in (e.g. plug-in) to the word processing system, such as in a toolbar, pop-up window, tab, frame, and/or the like. The GUI 300 may also be displayed in a dedicated application, a web browser, and/or the like. In the example shown in FIGS. 3A-3E, the GUIs 300 include a word processing application pane 308 and a citation detection pane 302. The citation detection pane 302 may be configured as a toolbar, pop-up window, tab, frame, and/or the like.

Figure 3A:
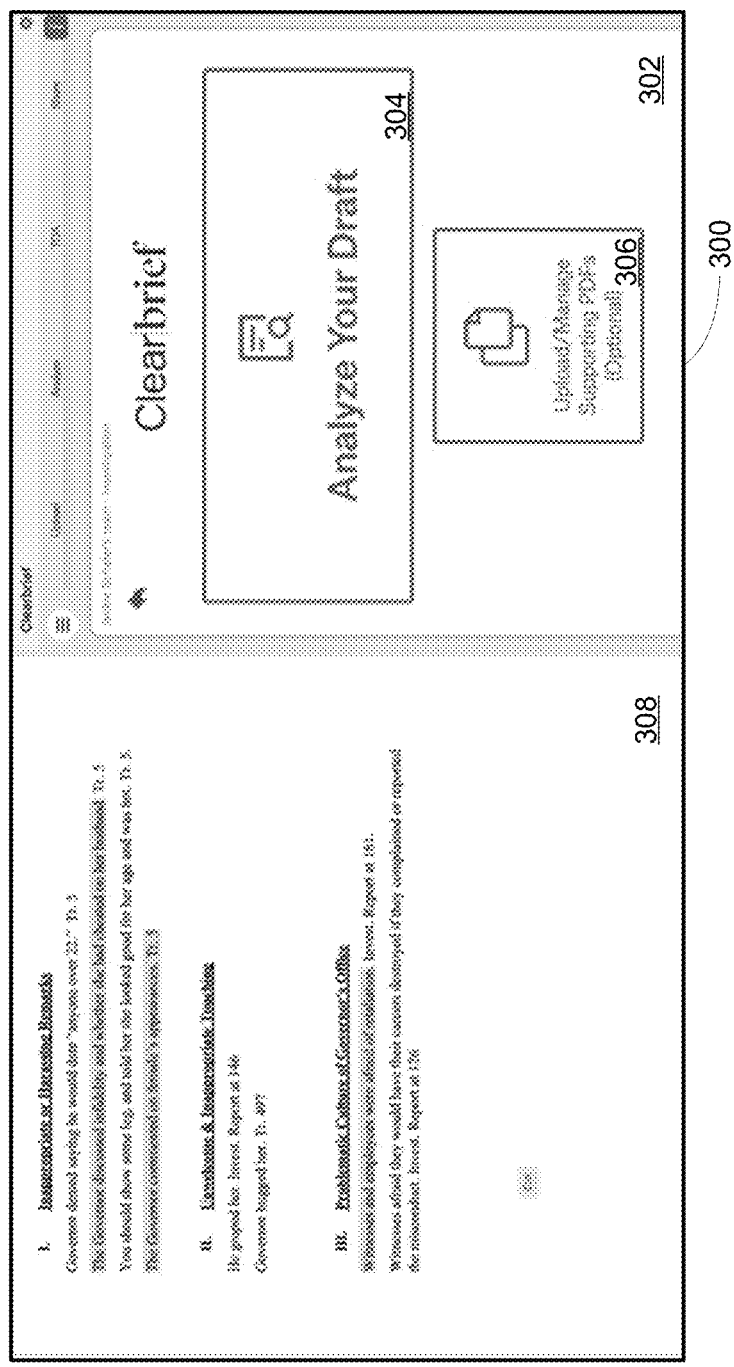

Referring to FIG. 3A, the citation detection pane 302 may include an option 304 to analyze a draft textual document (e.g., a user may select option 304 to analyze the document appearing in the word processing application pane 308 or drag a document onto it). The citation detection pane 302 may include an option 306 to drag in or select documents (e.g., PDFs or other record files) that the user may want to refer to in their draft. In some examples, a user may upload and/or select files to be cited to prior to drafting and/or editing the textual document, while drafting and/or editing the textual document, or after drafting and/or editing the textual document. In some non-limiting embodiments, instead of the user dragging the files into the GUI 300, the system may automatically index a database of files at a location controlled by the user (e.g., an internal database of internal investigation summaries, case law, images, videos, and/or the like). In non-limiting embodiments, when a user selects option 304, the system may begin the process shown in FIG. 2. In some non-limiting embodiments, in addition to detecting factual citations, selection of option 304 may process the textual document in other ways concurrently or in sequence. As an example, it may be determined which text fragments are likely to be legal citations (e.g., citations to case law, statutes, regulations, and/or the like), so that these text fragments can be disregarded and/or extracted for other purposes. In some examples, the system may automatically retrieve publicly-available sources for such legal citations or other citations for display and/or download.

Figure 3B:
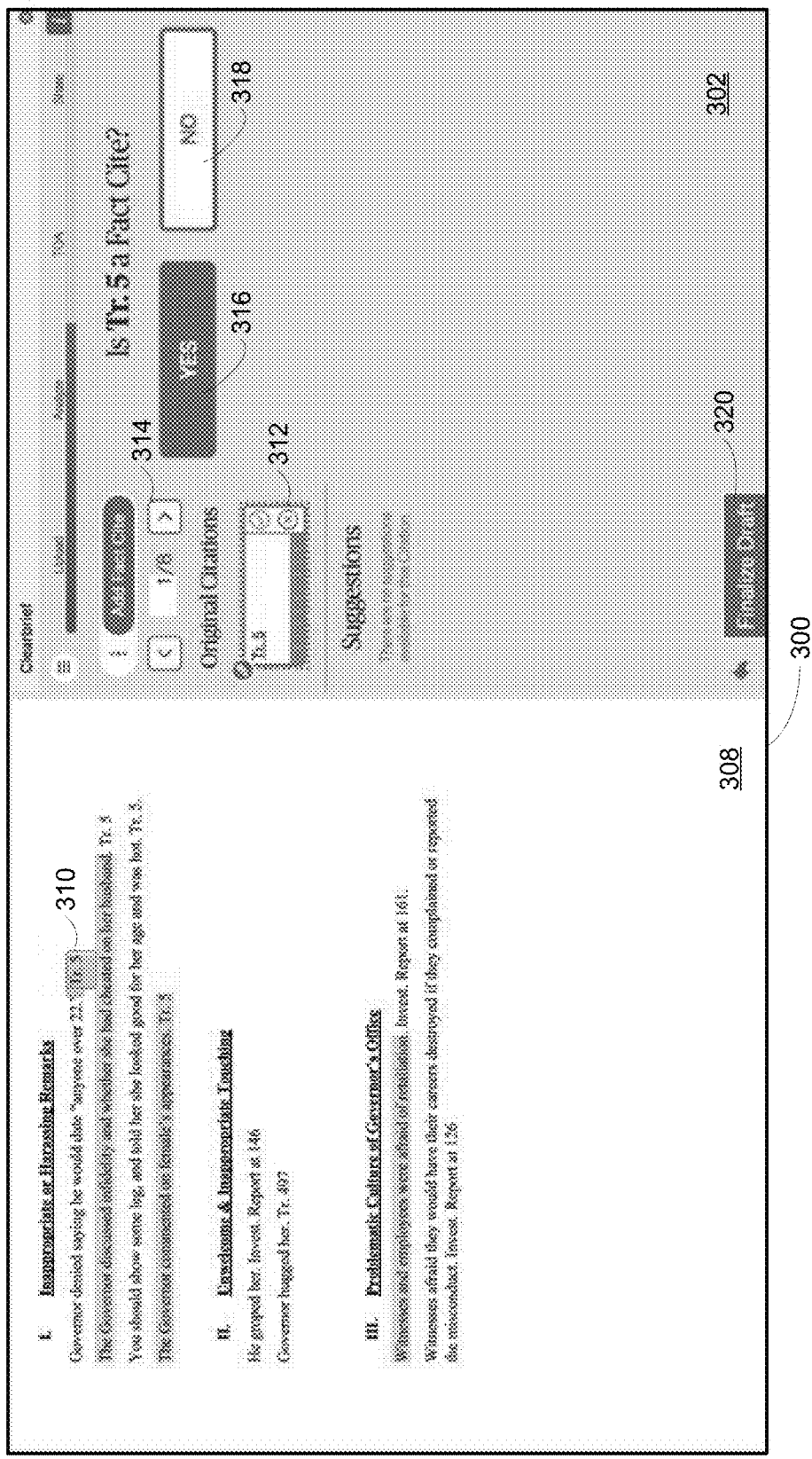

Referring now to FIG. 3B, a display of the GUI 300 is shown after the document is processed. The word processing application pane 308 may highlight a factual citation 310 and the citation detection pane 302 may display information for that particular factual citation 310. FIG. 3B may be displayed after step 206 in FIG. 2, as an example, such that the second plurality of predicted factual citations are iterated through. The citation detection pane 302 includes selectable options 316, 318 for a user to confirm or deny that the factual citation 310 is actually a factual citation. For example, selecting option 316 indicates that the citation is correct and the predicted citation may then, or after further steps, become a true citation and be used as a positive training sample. Selecting option 318 may indicate that the citation is incorrect and the predicted citation may then be added to a list of invalid citations (e.g., a list of citations that are used to check predicted citations against before they are presented) and/or used as a negative training sample. The other factual citations in the document may be viewed in the cite detection pane 302 by selecting option 314 or otherwise iterating through each of a plurality of predicted factual citations. An option 312 is also provided to accept or reject suggested citations and the user's selection may be used to improve the algorithm(s) for suggesting citations. In some examples, if the user confirms that the factual citation 310 is actually a factual citation (e.g., by selecting option 316 or the like), the user may be prompted to upload or select the referenced source document from a list of previously uploaded and indexed documents. In some non-limiting embodiments, the source document and/or specific page of the source document may be automatically identified and linked to the citation. A finalized draft option 320 is configured to, in response to being selected, accept all of the predicted factual citations and output a final document. The final document may include factual citations that are linked to the corresponding source document.

Figure 3C:
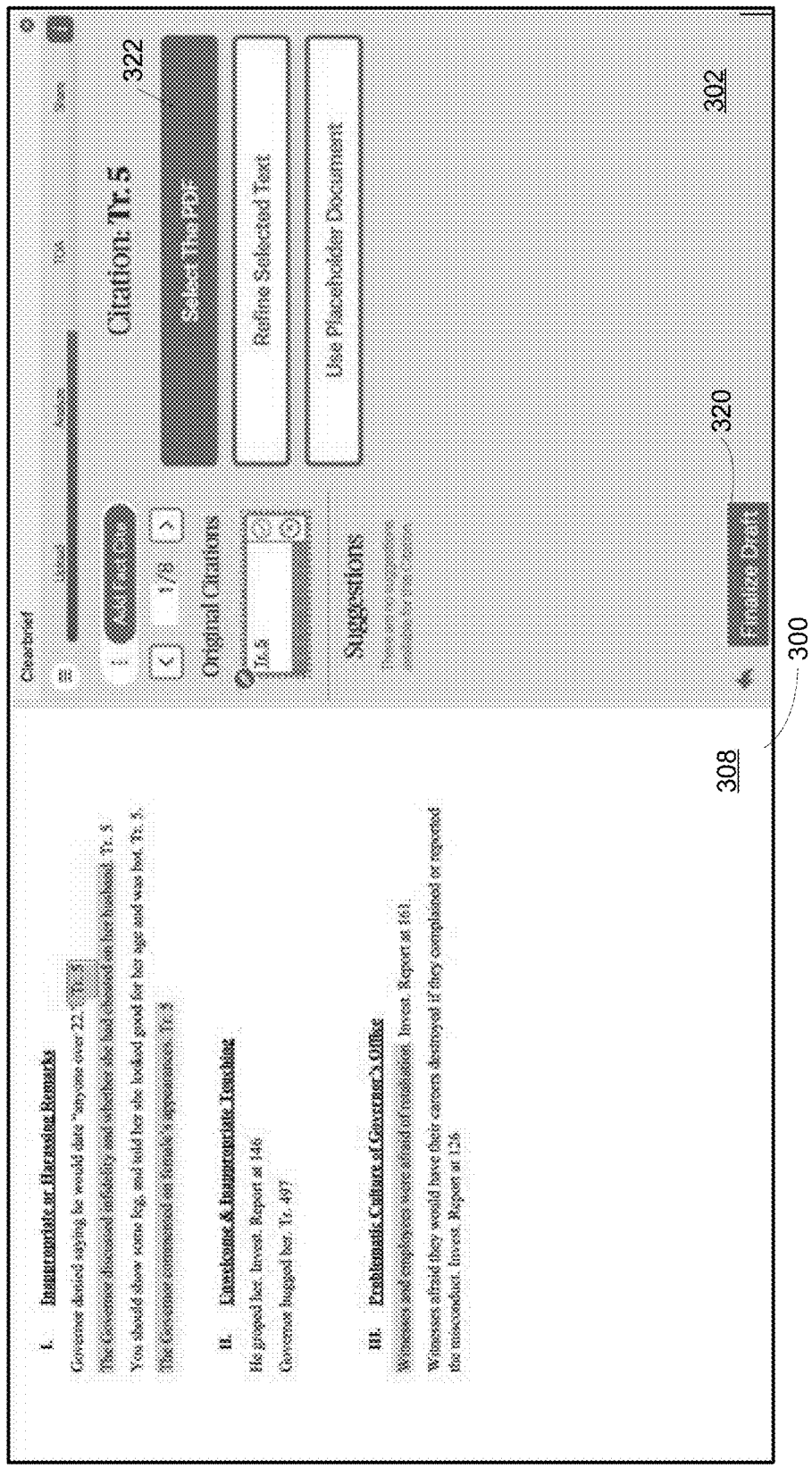

Referring now to FIG. 3C, a display of the GUI 300 after a user confirms a factual citation includes a selectable option 322 to select a source document in addition to options for refining the selected text and using a placeholder document (e.g., if the source is not available). The user may refine the selected text by, for example, expanding or contracting the text fragment. For example, if the system identified "r. 5" the user could expand the selected text in the word processor to include "Tr. 5" as the scope. The modification in scope may also be used to train the machine-learning model and/or configure user-specific preferences in some examples. In some non-limiting embodiments, the source document may be automatically identified from a document repository and/or from previously identified documents.

Figure 3D:
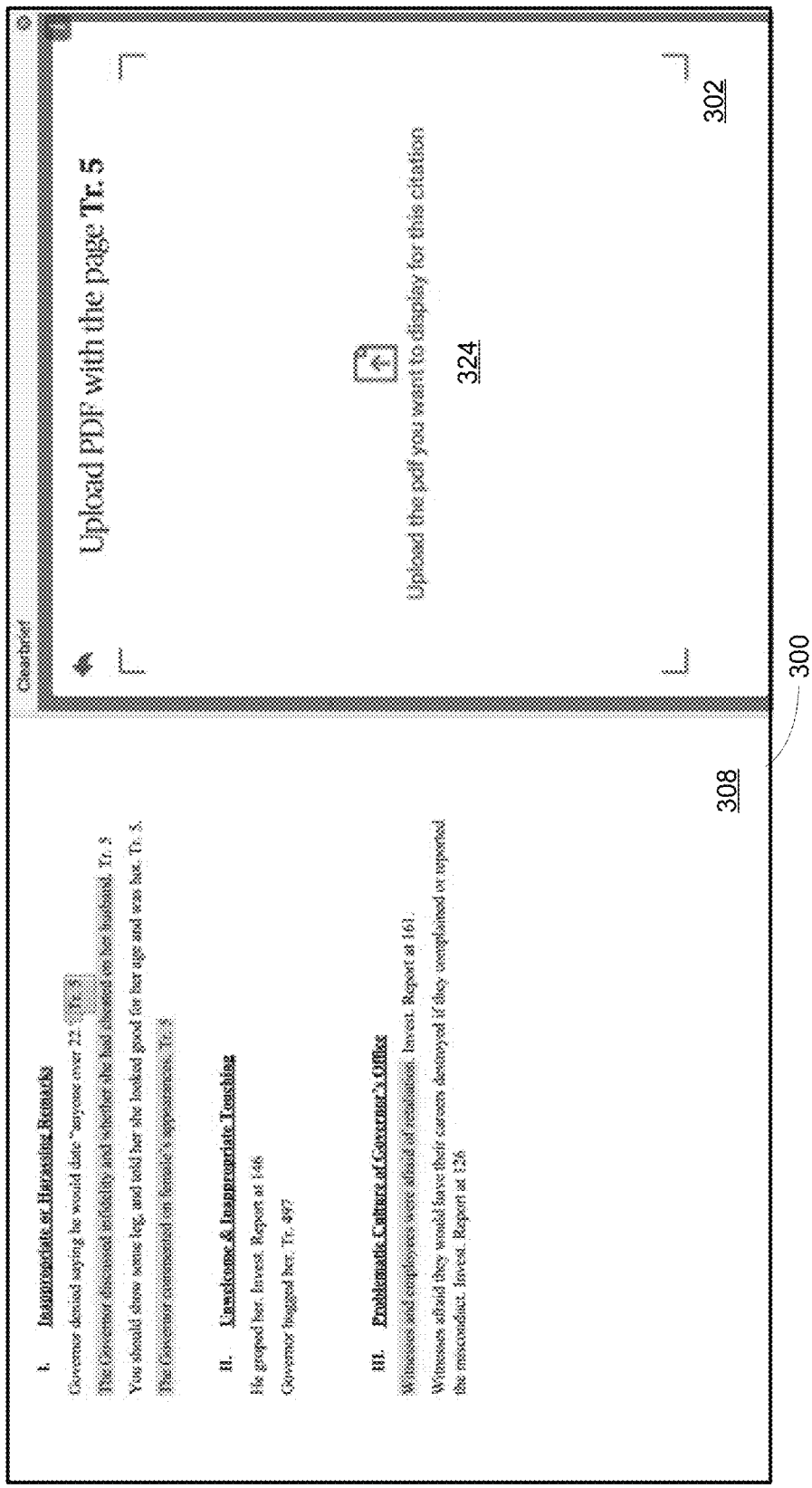

If a user chooses to select a source document, a region 324 for dragging a source document may be displayed as shown in the non-limiting embodiment of FIG. 3D. Once a source document is uploaded or selected, the source document 326 may be displayed in the citation detection pane 302 as shown in the non-limiting embodiment of FIG. 3E. The user may be presented with the source document (e.g., the full source document or a portion thereof) to select the page to be displayed in connection with the factual citation in the textual document. For example, if a range of pages is cited, a user may want a particular page in the range to be displayed. In some non-limiting embodiments, the user may select a page or pages from the source document 326 to confirm the factual citation or to change the pages cited in the factual citation. In some examples, the user may select and/or confirm a particular portion of a page (e.g., lines, paragraphs, and/or the like) that corresponds to the citation.

Figure 3E:
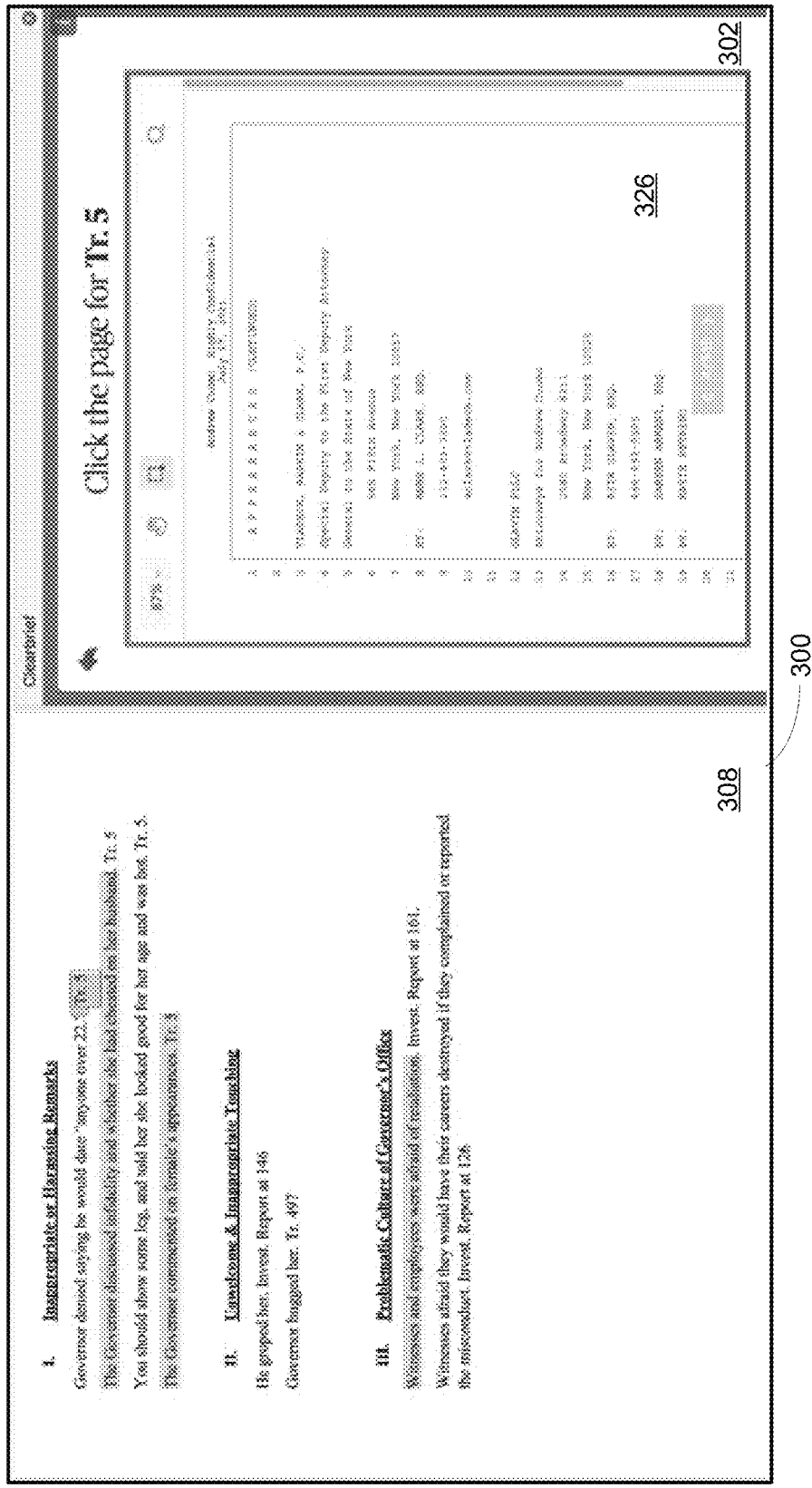
Figure 3F:
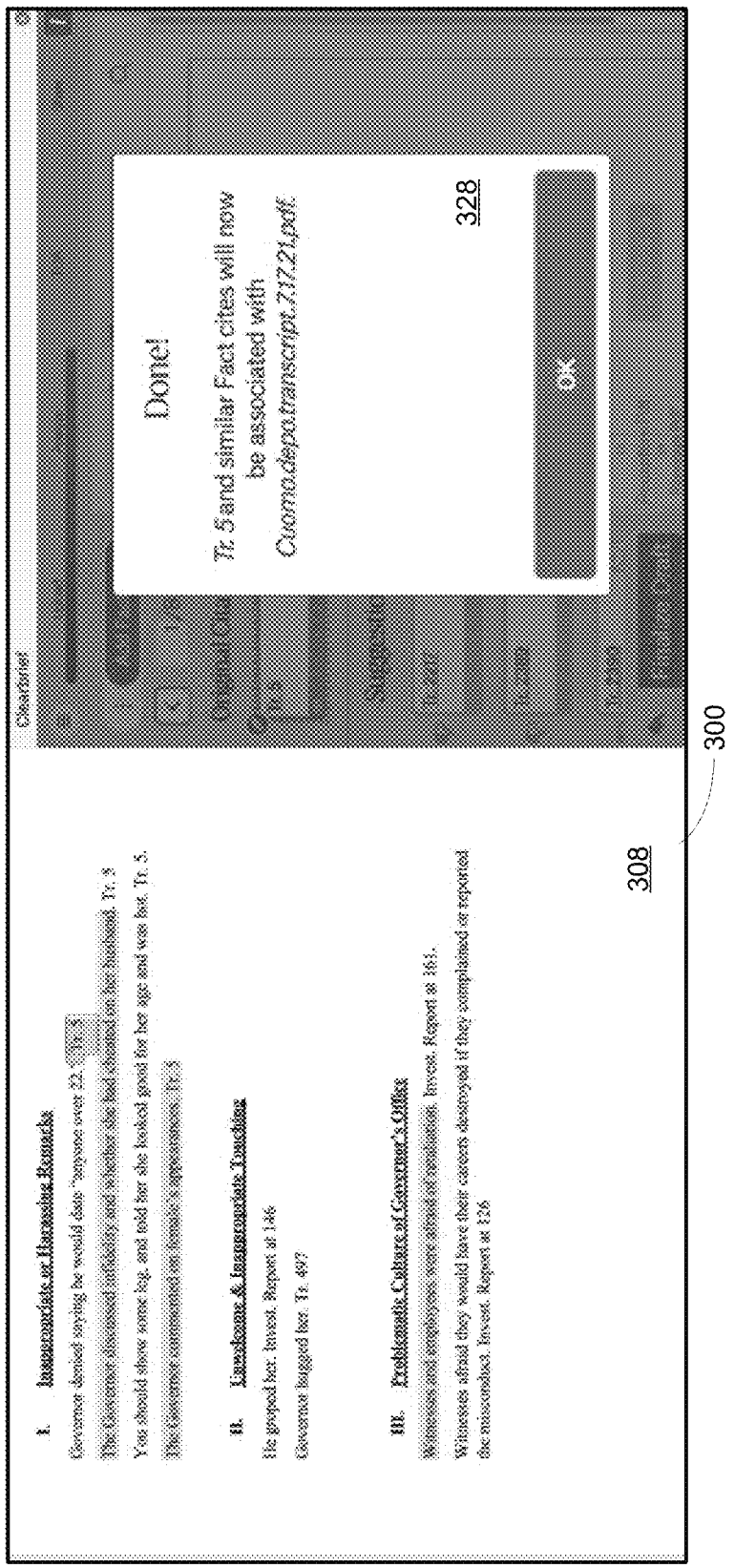

In some non-limiting embodiments, the process shown in FIGS. 3D and 3E may be performed once for each source document or once for each factual citation. For example, after the user confirms or provides the source document and page number, the system may establish a rule that all references to this source document should be "Tr." followed by a number or range of numbers. This rule may be used in some examples to determine which page to display for any additional source documents matching this citation formation. This rule may be used to suggest modifications to other citations that may be erroneous, as an example. In some non-limiting embodiments, the system may detect paragraphs and/or line numbers in the source document 326 to confirm the accuracy of the factual citation. In some non-limiting embodiments, suggested modifications to the factual citation (e.g., such as the page(s), line(s), and/or paragraph(s) cited) may be displayed as an option for the user to select. Such suggestions may be generated based on rules and/or previously-confirmed factual citations, and the user's selection thereof may be used for training.

In some non-limiting embodiments, through a GUI, a user may specify a modification to a factual citation in a manner that does not change prior or subsequent citations. For example, in some situations a source document (such as a PDF) may include several individual documents compiled within, which may or may not have consistent numbering, document stamps (e.g., Bates labels), citation types (e.g., lines or paragraphs), and/or the like. The user may want to cite to individual documents and/or portions thereof within the larger source document, and may modify the citation to include sub-names or additional citation parameters such that multiple citation names may be part of a single source document.

Figure 3G:
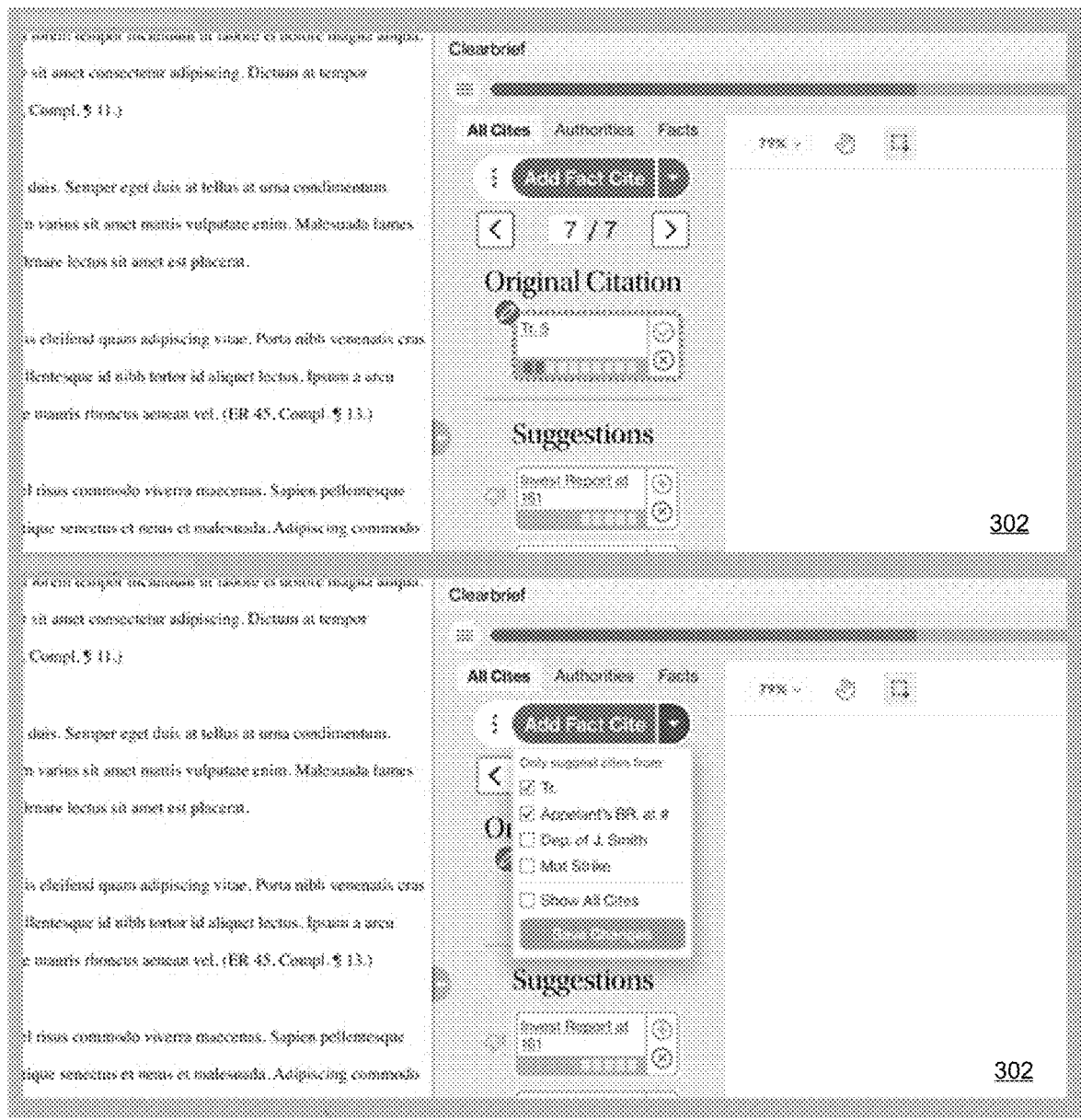

In non-limiting embodiments, and referring to FIGS. 3G-J, a display of the GUI 300 may include one or more suggested citations displayed in the citation detection pane 302 for replacing an original citation. A user may restrict the source documents that are analyzed for providing the suggested citation(s). For example, as shown in FIG. 3G a user may select an option (e.g., from a drop-down menu or the like) as a filter to limit the source documents to a transcript and a particular brief. A user may select all or a subset of source documents as the basis for providing suggested citations. Analyzing less than the entire corpus of source documents for suggested citations may result in more accurate suggestions, fewer suggestions, and/or faster processing. In some non-limiting embodiments, the selection of a subset of source documents may be a filter for the suggested citations that are displayed such that all possible source documents are analyzed but only a subset of suggestions are displayed on the GUI 300 based on the selected subset of source documents.

Figure 3I:
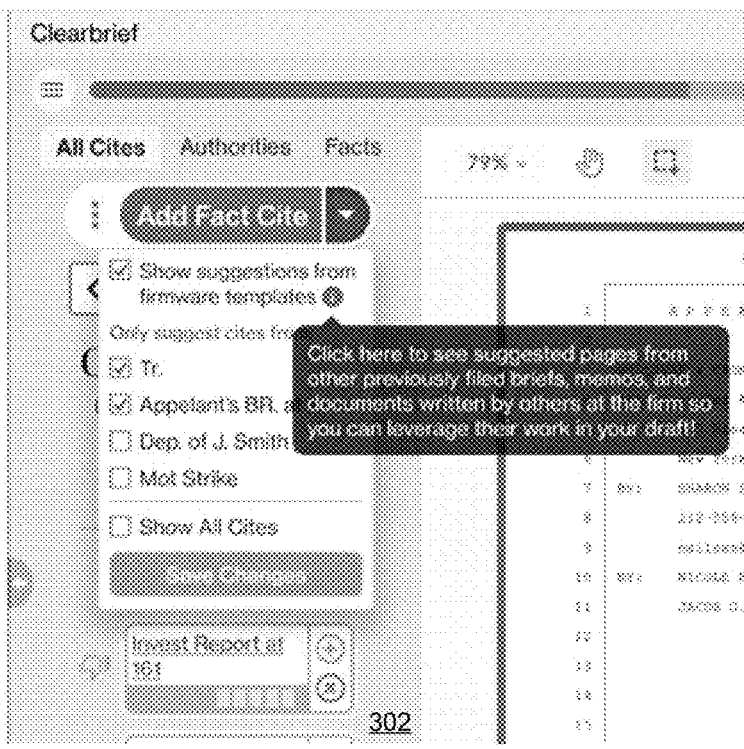
Figure 3J:
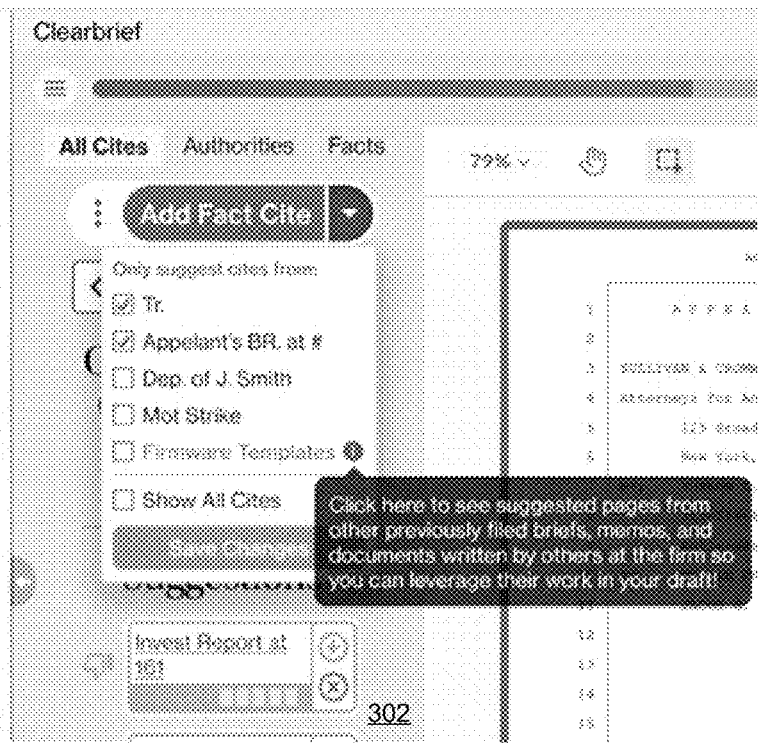

Referring to FIGS. 3I and 3J, in non-limiting embodiments a user may expand the scope of data (including source documents and/or previously processed documents) used to generate the suggested citation(s) to include other textual documents (e.g., prior briefs, memoranda, and/or other documents) from other users (e.g., users within a firm, users within a practice group, and/or the like).

Figure 5:
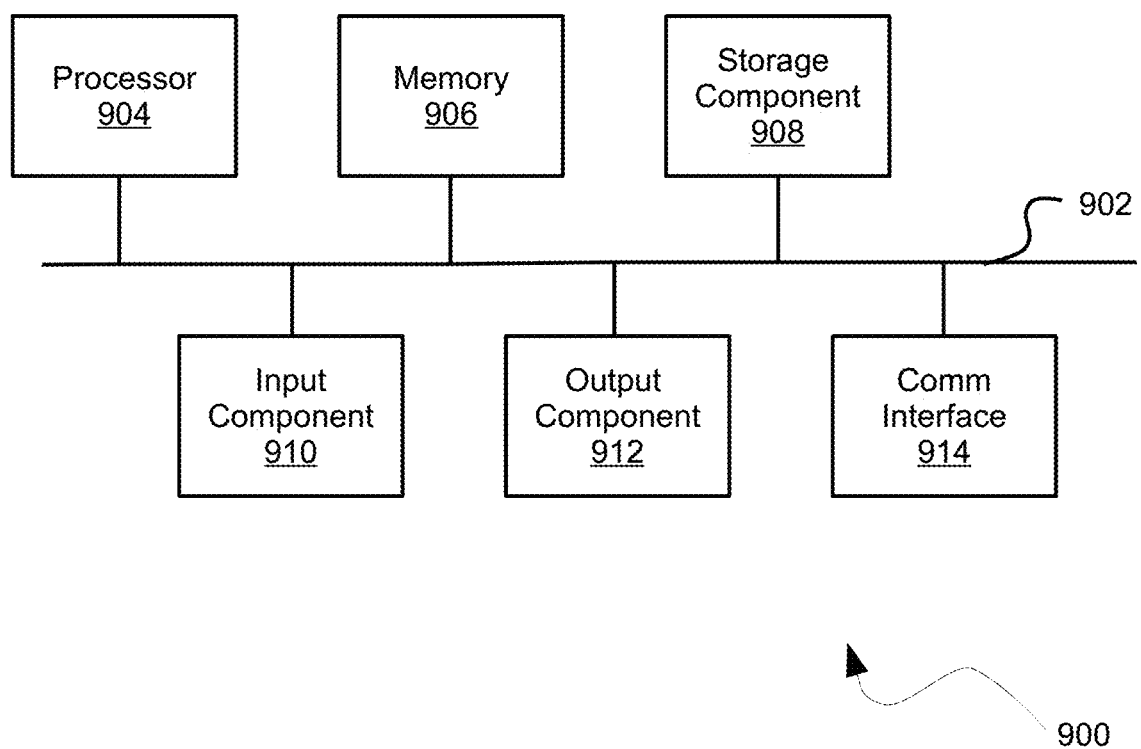
FIG. 5 illustrates example components of a device used in connection with non-limiting embodiments or aspects of systems, methods, and computer program products for automated factual citation detection.

Referring now to FIG. 5, shown is a diagram of example components of a computing device 900 for implementing and performing the systems and methods described herein according to non-limiting embodiments. In some non-limiting embodiments, device 900 may include additional components, fewer components, different components, or differently arranged components than those shown. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 5, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method comprising:
    processing a textual document to identify a plurality of identified factual citations based on a machine-learning model;
    normalizing each identified factual citation of the plurality of identified factual citations, resulting in a plurality of normalized identified factual citations;
    detecting at least one citation pattern in the plurality of normalized identified factual citations;
    generating at least one citation format rule based on the at least one citation pattern; and
    determining a plurality of factual citations from the textual document based on the at least one citation format rule.

2. The computer-implemented method of claim 1, further comprising:
    tokenizing the textual document into a plurality of tokens corresponding to strings in the textual document before processing the textual document with the machine-learning model.

3. The computer-implemented method of claim 2, wherein the machine-learning model is configured to receive, as input, a group of tokens of the plurality of tokens and output a prediction, the group of tokens comprising a target token, between 1 and 20 adjacent tokens preceding the target token, and between 1 and 20 adjacent tokens succeeding the target token, and wherein the plurality of identified factual citations is based on predictions for each token of the plurality of tokens.

4. The computer-implemented method of claim 1, wherein the machine-learning model comprises a classification model configured to receive a text fragment as input and output a classification.

5. The computer-implemented method of claim 1, further comprising:
    processing the plurality of normalized identified factual citations based on at least one rule-based algorithm to eliminate at least one normalized identified factual citation of the plurality of normalized identified factual citations before generating the at least one citation format rule.

6. The computer-implemented method of claim 1, further comprising:
    linking at least one source document from a plurality of source documents to each factual citation of the plurality of factual citations.

7. The computer-implemented method of claim 6, wherein linking the at least one source document to each factual citation of the plurality of factual citations comprises:
    inserting a hyperlinked citation into each factual citation which, when selected by a user, displays at least one corresponding source document.

8. The computer-implemented method of claim 6, further comprising:
    prompting a user for input prior to linking the at least one source document.

9. The computer-implemented method of claim 6, further comprising:
    displaying the at least one source document; and
    receiving a selection from a user of a page from the at least one source document, wherein linking the at least one source document to each factual citation of the plurality of factual citations is based on the page selected.

10. The computer-implemented method of claim 8, further comprising updating the machine-learning model based on the input.

11. The computer-implemented method of claim 8, wherein the input comprises uploading or identifying a location of a source document for at least one factual citation, the method further comprising:
    determining a page corresponding to the at least one factual citation based on comparing text to pages in the source document.

12. The computer-implemented method of claim 6, further comprising:
    receiving the plurality of source documents from a user, wherein linking the at least one source document from the plurality of source documents is performed automatically without user intervention.

13. The computer-implemented method of claim 6, further comprising:
    determining a page offset value based on the page corresponding to the at least one factual citation and a structure of the at least one source document; and
    modifying the at least one factual citation based on the page offset value.

14. The computer-implemented method of claim 1, further comprising:
    storing the at least one citation format rule in association with at least one of the following: a user, an entity, a source document, or any combination thereof; and
    processing a subsequent textual document based on the at least one citation format rule.

15. The computer-implemented method of claim 2, wherein tokenizing the textual document into the plurality of tokens comprises at least one of the following:
    replacing lower case words in the textual document with a token comprising a lowercase indicator;

replacing upper case words in the textual document with a token comprising an uppercase indicator; and replacing title case words in the textual document with a token comprising a titlecase indicator.

16. A system comprising at least one processor programmed to: process a textual document to identify a plurality of identified factual citations based on a machine-learning model;

normalize each identified factual citation of the plurality of identified factual citations, resulting in a plurality of normalized identified factual citations;

detect at least one citation pattern in the plurality of normalized identified factual citation; generate at least one citation format rule based on the at least one citation pattern; and determine a plurality of factual citations from the textual document based on the at least one citation format rule.

17. The system of claim 16, wherein the at least one processor is further configured to:

tokenize the textual document into a plurality of tokens corresponding to strings in the textual document before processing the textual document with the machine-learning model.

18. The system of claim 17, wherein the machine-learning model is configured to receive, as input, a group of tokens of the plurality of tokens and output a prediction, the group of tokens comprising a target token, between 1 and 20 adjacent tokens preceding the target token, and between 1 and 20 adjacent tokens succeeding the target token, and wherein the plurality of identified factual citations is based on predictions for each token of the plurality of tokens.

19. The system of claim 16, wherein the machine-learning model comprises a classification model configured to receive a text fragment as input and output a classification.

20. The system of claim 16, wherein the at least one processor is further configured to:

process the plurality of normalized identified factual citations based on at least one rule-based algorithm to eliminate at least one normalized identified factual citation of the plurality of normalized identified factual citations before generating the at least one citation format rule.

21. The system of claim 16, wherein the at least one processor is further configured to:

link at least one source document from a plurality of source documents to each factual citation of the plurality of factual citations.

22. The system of claim 21, wherein linking the at least one source document to each factual citation of the plurality of factual citations comprises:

inserting a hyperlinked citation into each factual citation which, when selected by a user, displays at least one corresponding source document.

23. The system of claim 21, wherein the at least one processor is further configured to:

prompt a user for input prior to linking the at least one source document.

24. The system of claim 21, wherein the at least one processor is further configured to:

display the at least one source document; and receive a selection from a user of a page from the at least one source document, wherein linking the at least one source document to each factual citation of the plurality of factual citations is based on the page selected.

25. The system of claim 23, wherein the at least one processor is further configured to update the machine-learning model based on the input.

26. The system of claim 21, wherein the at least one processor is further configured to:

determine a page offset value based on the page corresponding to the at least one factual citation and a structure of the at least one source document; and modify the at least one factual citation based on the page offset value.

27. The system of claim 16, wherein the at least one processor is further configured to:

store the at least one citation format rule in association with at least one of the following: a user, an entity, a source document, or any combination thereof; and process a subsequent textual document based on the at least one format citation rule.

28. A computer program product comprising at least one non-transitory computer-readable medium including program instructions that, when executed by at least one processor, cause the at least one processor to:

process a textual document to identify a plurality of identified factual citations based on a machine-learning model;

normalize each identified factual citation of the plurality of identified factual citations, resulting in a plurality of normalized identified factual citations;

detect at least one citation pattern in the plurality of normalized identified factual citation;

generate at least one citation format rule based on the at least one citation pattern; and determine a plurality of factual citations from the textual document based on the at least one citation format rule.

* * * * *